United States Patent [19]

Mayer-Schwinning et al.

[11] Patent Number: 5,439,508

[45] Date of Patent: Aug. 8, 1995

[54] PROCESS OF SEPARATING HALOGENATED DIOXINS AND FURANS FROM EXHAUST GASES FROM COMBUSTION PLANTS

[75] Inventors: Gernot Mayer-Schwinning, Bad Homburg; Günter Böning, Frankfurt am Main, both of Germany

[73] Assignee: Metallgesellschaft Aktiengesellschaft, Frankfurt am Main, Germany

[21] Appl. No.: 120,578

[22] Filed: Sep. 10, 1993

[30] Foreign Application Priority Data

Oct. 3, 1992 [DE] Germany .......... 42 33 303.2

[51] Int. Cl.$^6$ .......................................... B03C 3/013
[52] U.S. Cl. .......................................... 95/58; 95/69; 95/71; 96/52; 96/57
[58] Field of Search .......... 95/58, 61, 69, 71; 96/27, 52, 53, 57

[56] References Cited

U.S. PATENT DOCUMENTS

| | | | |
|---|---|---|---|
| 1,331,225 | 2/1920 | Wolcott | 95/61 |
| 1,413,993 | 4/1922 | Rhodes | 95/61 |
| 2,746,564 | 5/1956 | Williams | 95/58 X |
| 3,212,878 | 10/1965 | Bouteille | 95/61 X |
| 4,006,066 | 2/1977 | Sparwald | 95/58 X |
| 4,141,697 | 2/1979 | Albanese | 95/61 |
| 4,874,400 | 10/1989 | Jury | 96/27 X |
| 5,137,546 | 8/1992 | Steinbacher et al. | 95/71 |

FOREIGN PATENT DOCUMENTS

0253563 1/1988 European Pat. Off. .
3919124 1/1990 Germany .

*Primary Examiner*—Richard L. Chiesa
*Attorney, Agent, or Firm*—Michael J. Striker

[57] ABSTRACT

For the separation of dioxins and furans from exhaust gases from combustion plants, particularly from refuse incinerating plants, a process is described in which the dust and the gaseous pollutants HF, HCl, $SO_2$, and $SO_3$ are first substantially entirely separated from the exhaust gases in known manner, the thus prepurified exhaust gas is then supplied to a wet-process electrostatic precipitator, and 10 to 500 mg activated carbon powder per $sm^3$ are added to the prepurified exhaust gas immediately before it enters the wet-process electrostatic precipitator.

6 Claims, 1 Drawing Sheet

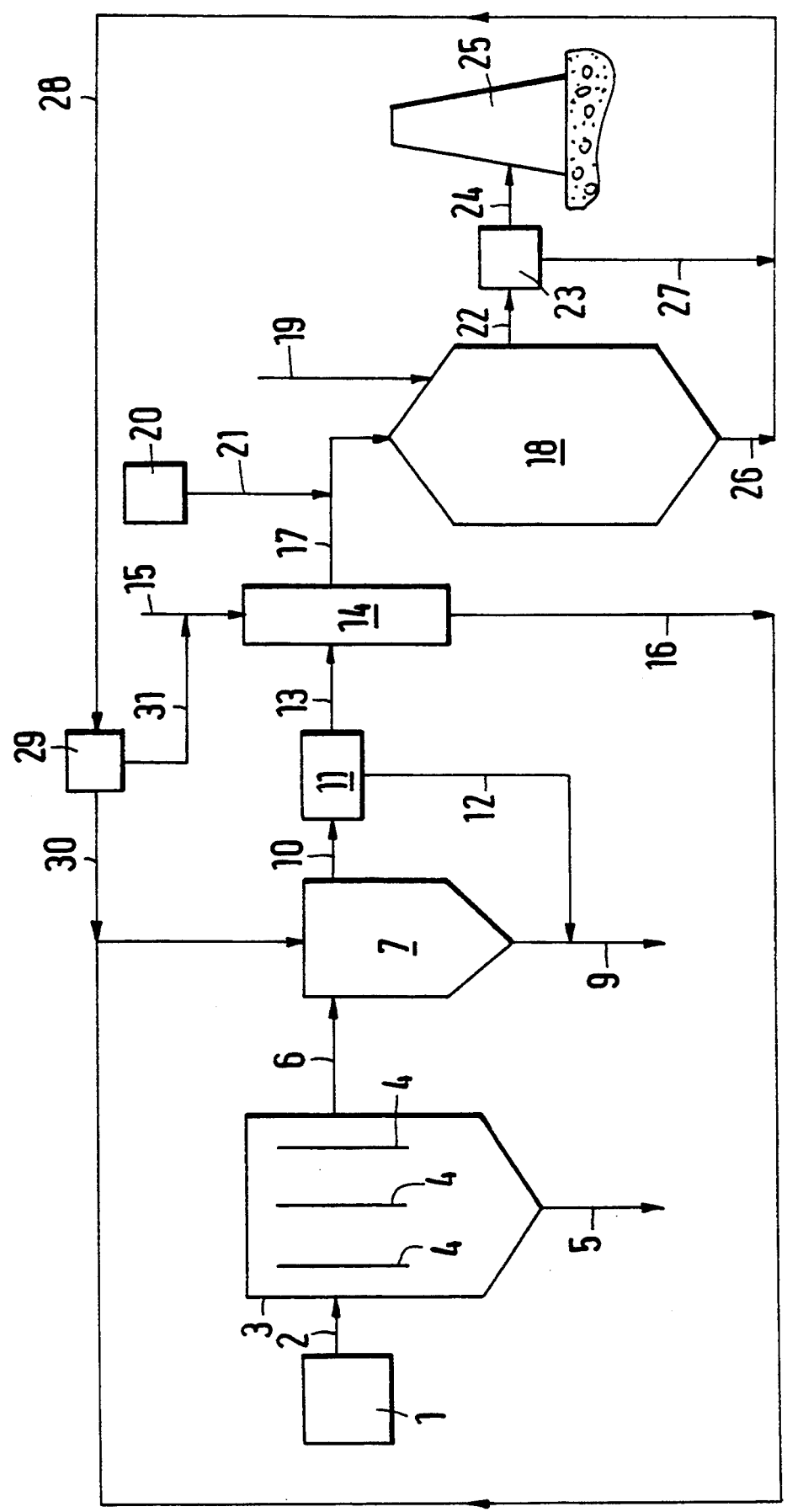

PROCESS OF SEPARATING HALOGENATED DIOXINS AND FURANS FROM EXHAUST GASES FROM COMBUSTION PLANTS

BACKGROUND OF THE INVENTION

This invention relates to a process of separating halogenated dioxins and furans from exhaust gases from combustion plants; particularly from refuse incinerating plants.

The exhaust gases of combustion plants are known to contain halogenated dibenzodioxins and halogenated dibenzofurans. Some of the compounds are extremely toxic and for this reason must almost entirely be removed from the combustion exhaust gases. For the sake of brevity the halogenated dibenzodioxins and the halogenated dibenzofurans are described hereinafter as dioxins and furans.

A large number of processes of separating dioxins and furans from combustion exhaust gases are already known.

For instance, Published German Application 3,919,124 proposes for separating polycyclic hydrocarbons which are deleterious to health from exhaust gases of refuse incinerating plants a process in which the exhaust gases which have been prepurified to remove dust, HCl, HF, $SO_x$, $NO_x$, and heavy metals are subjected to an absorption-filtration process in the temperature range of 70° to 160° C. to remove the remaining polycyclic hydrocarbons and heavy metals. In the process the prepurified exhaust gases are first mixed in a reactor with finely divided absorbents and are subsequently delivered to a filtering separator, in which an absorbent cake is formed on the filter cloth and is flown through by the exhaust gases. This results in a substantially complete separation of polycyclic hydrocarbons. In the known process, activated carbon, molecular sieves, sodium sulfide, and hydrate of lime are used, e.g., as absorbents.

In other known processes, carbonaceous adsorbents are used in fixed or slipping beds for a separation of organic pollutants.

Finally, European Patent Specification 253,563 discloses a process of separating the vaporous deleterious organic compounds from a dust-containing hot exhaust gas stream coming from a combustion plant. That process includes also the removal of acid components from the exhaust gas. In that process the exhaust gas stream at a temperature from 135° to 400° C. is fed to a spray absorber chamber (spray absorber), in which an aqueous basic liquid absorbent is atomized and the exhaust gas is cooled to a temperature of 180° to 90° C. while the water contained in the liquid absorbent is evaporated. A particulate material is formed in the absorber chamber and contains the products of the reactions between the basic absorbent and the acid components of the exhaust gas and also contains unreacted absorbent. The particulate material and any remaining dust are separated from the exhaust gas in a particle separator which follows the absorber chamber. In the process, activated carbon powder at a rate of 1 to 800 mg per $sm^3$ ($sm^3$=standard cubic meter) of exhaust gas is blown into the exhaust gas stream at least at one location, which is disposed in the absorber chamber or between the absorber chamber and the particle separator. In any case the activated carbon powder is separated in the particle separator together with the particulate material. The particle separator consists of a bag filter or an electrostatic precipitator.

All known processes have the disadvantage that their separation efficiency for dioxins and furans is not sufficient. Besides, in the process known from European Patent Specification 253,563 the operation of an electrostatic precipitator at 90° to 180° C. in the presence of carbon dust involves a safety hazard because the carbon may be ignited in the electrostatic precipitator. Information is also available that electrostatic precipitators act as so-called "dioxin breeders", in which dioxins and furans are formed under the action of the electric field when the electrostatic precipitator is operated at elevated temperatures.

SUMMARY OF THE INVENTION

It is an object of the invention to provide a process by which a pure gas having a dioxin and furane content of less than 0.05 $ng/sm^3$ (specified as a toxicity equivalent in accordance with the NATO-CCMS. regulation) can reliably be obtained throughout the operating time. This object is attained in the method according to the present invention, in which a) the exhaust gases are first treated in known manner to substantially entirely remove dust, HF, HCl, $SO_2$, and $SO_3$ and b) the thus prepurified exhaust gases are fed to a wet-process electrostatic precipitator and 10 to 500 mg activated carbon powder per $sm^3$ are added to the exhaust gas immediately before it enters the precipitator.

The dust consisting of fly ash dust is separated in an electrostatic precipitator operated at 200° to 400° C. and/or in at least one cyclone and/or in at least one impingement separator. The gaseous pollutants HF, HCl, $SO_2$, and $SO_3$ are subsequently separated by a reaction with a dry adsorbent at 200° to 500° C. and/or by a reaction with an absorbent in a spray dryer to produce a dry reaction product and/or by a reaction with a liquid absorbent in at least one scrubber. The dioxins and furans are also separated in part during the separation of the dust and of the gaseous pollutants. The contents of dioxins and furans in the prepurified exhaust gases are so high that they would intolerably pollute the environment. It has surprisingly been found that the dioxin and furan contents of the prepurified exhaust gases can significantly be decreased in that the prepurified exhaust gases are fed to a wet-process electrostatic precipitator and activated carbon powder is added to the exhaust gases immediately before they enter the wet-process electrostatic precipitator. That mode of processing does not involve a safety hazard because the activated carbon powder cannot be ignited in the wet-process electrostatic precipitator, which always contains a mist of fine droplets of water and which is always operated at a temperature below 100° C. Besides, no dioxins are formed in the wet-process electrostatic precipitator because the dioxin content of the exhaust gas was consistently decreased in the wet-process electrostatic precipitator whereas it was often increased during the flow of the gases through a dry-process electrostatic precipitator, particularly after z relatively long operation. The term "powder" means that the activated carbon suspended in the exhaust gas stream has a particle diameter below 800 micrometers, particularly below 100 micrometers, and is not granulated. The term "activated carbon" comprises the substances which have a porous structure and consist of minute graphite particles and/or amorphous carbon and have an internal surface area between 30 and 2000 m²/g, preferably between 200 and 1500 m²/g. By means of the process in accordance with the invention the dioxin and furan contents can be kept below 0.05 ng/sm³ (stated as a toxicity equivalent in the NATO-CCMS regulation) and the process is preferably used to purify exhaust gases produced by the incineration of refuse.

According to a suitable feature of the process in accordance with the invention, 20 to 200 mg activated carbon powder are added per sm³.

The process in accordance with the invention can be carried out with a particularly high safety in operation if the wet-process electrostatic precipitator is operated at a temperature of 40° to 95° C., at a voltage of 20 to 120 kilovolts, at a current value of 50 to 600 milliamperes and with a water supply rate of 0.002 to 0.2 liters per sm³ of prepurified exhaust gas, and the water is sprayed into the wet-process electrostatic precipitator close to the inlet for the exhaust gas. In a wet-process electrostatic precipitator, dust is almost entirely removed so that the activated carbon powder is also separated and the pure gas contains less than 10 mg dust per sm³. The droplets of water are also entirely retained in the electrostatic precipitator.

According to a suitable feature of the process a voltage of 30 to 80 kilovolts is applied.

According to a further feature of the invention, dry activated carbon or an aqueous suspension of activated carbon is suspended in the stream of the prepurified exhaust gas. In both cases the solids are uniformly distributed in the gas stream.

An advantage afforded by the process in accordance with the invention resides in that at least part of the water required for the operation of the wet-process electrostatic precipitator can be produced in that the water vapor contained in the prepurified exhaust gas is condensed in the wet-process electrostatic precipitator. Because the combustion exhaust gases have a certain content of water vapor, which either originates from the fuel or is introduced into the exhaust gases by the quasi-dry or wet processes by which the gaseous pollutants are separated, it is desirable to minimize the water consumption of the wet-process electrostatic precipitator in that at least part of the water required for the operation of the wet-process electrostatic precipitator is produced by condensation in the wet-process electrostatic precipitator.

Another advantage afforded by the process in accordance with the invention resides in that the activated carbon-containing aqueous effluent from the wet-process electrostatic precipitator may be fed to those process stages in which gaseous pollutants are separated by a wet or quasi-dry processing. For this reason the aqueous effluent from the wet-process electrostatic precipitator can entirely be recycled the purifying process so that a production of waste water will be avoided. The activated carbon is removed from the process cycle together with the reaction products which have been formed in the wet or quasi-dry purification stages.

If the gaseous pollutants HF, HCl, $SO_2$, and $SO_3$ are separated by a dry processing or if a content of activated carbon would not be permissible in the reaction products which are formed in conjunction with the separation of gaseous pollutants, the activated carbon may be removed by filtration from the gaseous effluent leaving the wet-process electrostatic precipitator and may subsequently be combusted. In that case the dioxins and furans adsorbed by the activated carbon are desirably destroyed by incineration.

For technical and economic reasons it is desirable in the performance of the process in accordance with the invention to substantially dedust the exhaust gases from the combustion plant by an impingement separation in a steam producer, to subject the dedusted exhaust gases in a spray absorber to a reaction with an aqueous suspension of $Ca(OH)_2$ in order to substantially remove HF, HCl, $SO_2$, and $SO_3$, to separate the dry dustlike reaction products which have been formed in the spray absorber in a cloth filter from the exhaust gases from which the gaseous pollutants have been removed, to separate in a scrubber the remaining pollutants still contained in the exhaust gases, to mix the thus prepurified exhaust gases with activated carbon and to feed them to a wet-process electrostatic precipitator, and to use the activated carbon-containing aqueous effluent from the wet-process electrostatic precipitator for the formation of the $Ca(OH)_2$ suspension which is fed to the spray absorber. By that processing it has been possible to achieve dioxin and furan contents below 0.03 ng/sm³ (specified as a toxicity equivalent in the NATO-CCMS regulation) through a long operating time.

BRIEF DESCRIPTION OF THE DRAWING

The subject matter of the invention will now be explained in more detail with reference to the drawing and to an illustrative embodiment.

DESCRIPTION OF THE PREFERRED EMBODIMENT

The hot combustion exhaust gas is conducted from the refuse incinerator 1 through the exhaust gas duct 2 into the heat exchanger 3, in which steam is produced or superheated and the combustion exhaust gas from 2 is cooled on heating surfaces 4 to a temperature of about 350° C. and at the same time is substantially dedusted by an impingement separation. The separated dust—i.e., the dustlike fly ash—is withdrawn from the heat exchanger 3 through the line 5. The exhaust gas which has been cooled and substantially dedusted is conducted through line 6 to the spray absorber 7, which is fed through line 8 with an aqueous suspension of $Ca(OH)_2$. In the spray absorber the exhaust gas is cooled to a temperature of about 130° C. and the water of the $Ca(OH)_2$ suspension is evaporated at the same time. Besides, the $Ca(OH)_2$ reacts with the gaseous pollutants HF, HCl, $SO_2$, and $SO_3$ to form $CaF_2$, $CaCl_2$, $CaSO_3$, and $CaSO_4$. Said reaction products and unconsumed $Ca(OH)_2$ become available as a fine-grained product and are withdrawn from the spray absorber 7 through line 9. Dust particles which have not been removed from the exhaust gas in the heat exchanger 3 are also absorbed in the spray absorber 7.

The exhaust gas from which the dust and the gaseous pollutants have substantially entirely been removed flows through line 10 to a cloth filter 11, in which the dustlike particles are separated which are contained in the exhaust gas stream which leaves the spray absorber 7. The cloth filter 11 is periodically cleaned and the dust which has thus been removed is conducted through line 12 into line 9. The exhaust gas leaving the cloth filter flows through line 13 into the scrubber 14, which may optionally consist of a plurality of stages and in which residual dust particles and particularly residual gaseous pollutants are removed by scrubbing. The scrubber 14 is fed through line 15 with an aqueous suspension of Ca- (OH)$_2$ and optionally with water. The liquid effluent from the scrubber 14 is passed through line 16 into the line 8 and is thus fed to the spray absorber 7. The exhaust gas is cooled in the scrubber 14 to a temperature of about 60° to 70° C.

The exhaust gas stream which has left the scrubber 14 is fed through line 17 to the wet-process electrostatic precipitator 18, into which water is injected from line 19. Activated carbon powder from the supply bin 20 is fed through line 21 into line 17. The exhaust gas from the wet-process electrostatic precipitator 18 flows through line 22 to the mist separator 23 and thereafter through line 24 to the chimney 25, from which the exhaust gas can be discharged into the atmosphere.

The activated carbon-containing aqueous effluent leaves the wet-process electrostatic precipitator 18 through line 26 and leaves the mist separator 23 through line 27 and is fed through line 28 to a slurrying container 29, in which an aqueous suspension of Ca(OH)$_2$ is formed. That suspension is fed through lines 30 and 8 to the spray absorber 7. A partial stream of the Ca(OH)$_2$ suspension is fed from the slurrying container 29 through line 31 to the line 15 and is optionally diluted with water there.

The combustion exhaust gas conducted in line 2 had a dust content of 4 to 5 g/sm$^3$ and the pure gas leaving the chimney 25 had a residual dust content below 10 mg/sm$^3$. The exhaust gas stream conducted in line 2 contained the following gaseous pollutants per sm$^3$:35 mg HF, 1450 mg HCl, 900 mg SO$_2$, and 70 mg SO$_3$.

The pure gas leaving the chimney 25 did not contain HF, HCl, and SO$_3$ and contained less than 5 mg SO$_2$ per sm$^3$. 1.35 moles Ca(OH)$_2$ were consumed per mole of the gaseous pollutants which had been removed. 100 mg activated carbon and 0.1 liter water were supplied to the wet-process electrostatic precipitator 18 per sm$^3$ of exhaust gas. 0.1 liter water per sm$^3$ exhaust gas was supplied also to the scrubber 14. Only the aqueous effluents from the wet-process electrostatic precipitator 18 and the mist separator 23 were used to slurry the Ca(OH)$_2$.

The contents of dioxins and furans were determined in two experimental periods of 7 days each. During both experimental periods the average contents of dioxins and furans in the exhaust gas stream conducted in line 6 was about 2.83 ng. During both experimental periods the exhaust gas stream conducted in line 10 had average dioxin and furan contents of 0.56 ng/sm$^3$. Average dioxin and furan contents of 0.224 ng/sm$^3$ were measured in line 17 before the addition of activated carbon. The average dioxin and furan contents in the chimney 25 amounted to 0.029 ng/sm$^3$ during the first measuring period and to 0.023 ng/sm$^3$ during the second measuring period. Activated carbon at a rate of 100 mg/sm$^3$ was used during both measuring periods.

In a control experiment, 50 mg activated carbon per sm$^3$ exhaust gas were fed to the spray absorber 7. In that case the average dioxin and furan contents in line 10 amounted to 0.021 ng/sm$^3$ but higher contents amounting to 0.071 ng/sm$^3$ were found in line 17. When 50 ng activated carbon were added per sm$^3$ exhaust gas in line 17, the average dioxin and furan contents were decreased in the wet-process electrostatic precipitator to 0.036 ng. From the control experiment it is apparent that advantages over the supply of activated carbon to the spray absorber will be afforded if the activated carbon is added to the prepurified exhaust gas immediately before it enters the wet-process electrostatic precipitator.

The analysis of dioxins and furans was performed in accordance with VSI-Vorschrift 3499, Blatt 2, "Kondensationsmethode, analysiert mittels GC/HMS" (condensing method, analysis by means of GC/HMS).

The dioxin and furan contents were calculated as a toxicity equivalent (ITE) in accordance with the NATO-CCMS regulation.

We claim:

1. A process of separating dioxins and furans from exhaust gases of combustion plants, said process comprising the steps of:
    a) treating an exhaust gas of a combustion plant to substantially entirely remove dust, HF, HCl, SO$_2$ and SO$_3$ to form a prepurified exhaust gas; and
    b) after said treating of step a), feeding said prepurified exhaust gas to a wet-process electrostatic precipitator and adding 10 to 500 mg activated carbon powder per sm$^3$ to said prepurified exhaust gas immediately prior to said feeding of said prepurified exhaust gas to said wet-process electrostatic precipitator;
    c. operating said wet-process electrostatic precipitator at a temperature of 40° to 95° C., with an applied voltage of 20 to 120 kilovolts and a current of 50 to 600 milliamperes and with a water supply rate of 0.002 to 0.2 liters per sm$^3$ of prepurified exhaust gas and spraying water into the wet-process electrostatic precipitator in the vicinity of an inlet of said precipitator through which said prepurified exhaust gas is fed to form a purified exhaust gas having dioxin and furan contents less than 0.05 ng/sm$^3$.

2. A process as defined in claim 1, wherein 20 to 200 mg of said activated carbon powder per sm$^3$ are added during said adding.

3. A process as defined in claim 1, wherein said voltage is from 30 to 80 kilovolts.

4. A process as defined in claim 1, wherein said activated carbon powder is dry, and further comprising suspending said activated carbon powder in a stream of the prepurified exhaust gas.

5. A process as defined in claim 1, further comprising preparing an aqueous suspension of said activated carbon powder and feeding said aqueous suspension into a stream of the prepurified exhaust gas.

6. A process as defined in claim 1, wherein said treating said exhaust gas to substantially entirely remove said dust, HF, HCl, SO$_2$ and SO$_3$ includes dedusting said exhaust gas by impingement separation and, after the impingement separation of said dust, treating said exhaust gas with an aqueous suspension of Ca(OH)$_2$ in a spray absorption process to remove said HF, HCl, SO$_2$ and SO$_3$.

* * * * *